(12) United States Patent
Ameloot

(10) Patent No.: US 8,779,302 B2
(45) Date of Patent: Jul. 15, 2014

(54) SYSTEM FOR FITTING AND ELECTRICALLY CONNECTING LIGHTING ELEMENTS

(75) Inventor: Paul Ameloot, Roeselare (BE)

(73) Assignee: Delta Light NV, Wevelgem (BE)

( * ) Notice: Subject to any disclaimer, the term of this patent is extended or adjusted under 35 U.S.C. 154(b) by 126 days.

(21) Appl. No.: 13/403,125

(22) Filed: Feb. 23, 2012

(65) Prior Publication Data

US 2012/0211275 A1    Aug. 23, 2012

(30) Foreign Application Priority Data

Feb. 23, 2011    (BE) .................................. 2011/0126

(51) Int. Cl.
*H05K 7/00*    (2006.01)

(52) U.S. Cl.
USPC ............... 174/520; 174/66; 174/67; 220/241

(58) Field of Classification Search
CPC ........... H02G 3/12; H02G 3/20; H01B 17/005
USPC ........................ 174/66, 67, 520; 220/241, 242
See application file for complete search history.

(56) References Cited

U.S. PATENT DOCUMENTS 3,987,928 A * 10/1976 Mori .............................. 220/241
5,456,373 A * 10/1995 Ford .............................. 220/242

FOREIGN PATENT DOCUMENTS

BE    1015228 A3    11/2004
EP    2187492 A1    5/2010

* cited by examiner

*Primary Examiner* — Dhirubhai R Patel
(74) *Attorney, Agent, or Firm* — Symbus Law Group, LLC; Clifford D. Hyra

(57) ABSTRACT

A system for fitting and electrically connecting lighting elements, including at least one junction box accommodated in a wall (11), the junction box having a housing (12) provided with an open front side parallel to the wall and with a power supply (15) therein, and a lath cover (2) with a pattern of holes (3) which is coupled to the front side of the housing in order to conceal the junction box in the wall, with a cover plate (1) being provided between the housing (12) and the lath cover (2).

14 Claims, 3 Drawing Sheets

SYSTEM FOR FITTING AND ELECTRICALLY CONNECTING LIGHTING ELEMENTS

This application claims the priority of Belgian patent application number 2011/0126, filed Feb. 23, 2011, which is hereby incorporated by reference herein in its entirety.

BACKGROUND

The invention relates to a system for fitting and electrically connecting lighting elements to a standard connecting system, such as for example those which are customary in North America (4" junction box or octagonal junction box, referred to below as junction box). The invention makes it possible to fit lighting components in a safe and legal manner, irrespective of the shape and dimensions of the junction boxes used.

In order to be able to use junction boxes for lighting elements in flammable structures such as wood, the junction box has to be completely enclosed because of the risk of fire. Existing junction boxes comprise a metal or equivalent housing which encloses the electrical wiring. The junction box can be concealed in the plastering of the structure by means of a lath cover.

A drawback associated with this is the fact that the electrical wiring has to have been installed in the box already and that it is no longer possible to carry out any installation in the box after plastering, unless the plaster and the lath cover are removed again. The lath cover is typically a perforated plate which is fitted to the junction box and to which plaster adheres well. An additional drawback associated with this is the fact that the plaster and the fitting screws of the lighting device get into the junction box. Other existing alternative solutions have a large connection opening as a result of which the minimum dimensions of the lighting components to be fitted are limited or make use of a cover plate which completely covers the junction box and onto which the lighting device itself is then fitted.

Modern light fixtures, such as LED lighting, for example, therefore have a backplate or canopy onto which the fixture is fitted. Normally, this backplate is not concealed in the wall, resulting in it being visible and the fixture not being present in its purest shape and design. The use of junction boxes as described above now requires the backplate to be mounted on top of the plaster. This is aesthetically detrimental to the minimalist design of small lighting devices. In addition, the national laws on electrical installations specify that the electrical connections have to be accessible at all times without structural parts having to be broken. This is not possible with the above-described method with the single perforated plate.

SUMMARY

It is therefore an object of the invention to solve these drawbacks in such a way that the backplate is not visible and that the wiring can be fitted in the junction box in a legal manner in accordance with, inter alia, the North-American installation regulations either before or after plastering.

This object of the invention is achieved by means of a system for fitting and electrically connecting lighting elements, comprising a housing provided with an open front side, with the housing being accommodated in the wall, and a lath cover with a pattern of holes which is fitted to the front side of the housing in order to be concealed in the wall, with the housing being covered by a cover plate and the lath cover being fitted at a distance therefrom.

This object of the invention is furthermore achieved by providing the cover plate and the lath cover with one or more suitable openings through which the power supply can be introduced into the housing of the lighting device or through which this power supply is accessible in the junction box itself without breaking structural parts. This may, for example, be a small LED power supply or transformer.

The expression "suitable" opening is understood to mean that the openings may be larger or smaller or may have a certain shape, as the application requires.

The cover plate prevents plaster from falling into the housing (junction box) or the fitting screws from being able to penetrate the electrical insulation in the junction box. Due to its pattern of holes, the lath cover makes it possible to use self-tapping screws which penetrate the plaster and find a suitable opening in the pattern of holes by themselves, as it were. Moreover, the combination of a cover plate and a lath cover can be adapted to the thickness of the surface to be plastered by fitting the lath cover closer to or further away from the cover plate.

In a specific embodiment of a system according to the invention, the power supply can be introduced into the housing after the wall finish or plaster has been completed. It is no longer necessary to fit them beforehand. The size of the openings is then adapted to satisfy the local requirements regarding access of electrical connections in electrical installations.

In a preferred embodiment, the cover plate is provided to cover at least the open front side of the housing completely, so that no plaster can get into it.

In a specific embodiment, the cover plate forms the base for mounting a fixture. By making the cover plate larger than the open front side of the housing, it is possible to create a larger mounting surface for mounting large fixtures. The dimensions of the cover plate are preferably adapted to the dimensions of the fixture to be mounted.

The cover plate is preferably made of metal, such as for example aluminum, or of plastic.

The cover plate comprises mounting means for securing the plate on the housing, as well as mounting means for securing the lath cover on the plate. The cover plate may also comprise mounting means for securely mounting the fixture on the plate.

In an alternative embodiment, one cover plate and/or one lath cover may close off several junction boxes or housings jointly. To this end, the junction boxes are preferably fitted nearly next to or above each other. The cover plate and/or lath cover are then preferably of a rectangular design.

In another embodiment, the jointly fitted junction boxes have different dimensions, with larger and smaller junction boxes with one common cover plate and/or lath cover being fitted in a uniform manner.

The cover plate and lath cover may have any shape which is suitable for covering one or more junction boxes which are fitted into the wall in any desired configuration.

BRIEF DESCRIPTION OF THE DRAWINGS

The invention will now be described in more detail by means of the following detailed description and drawings, in which.

DETAILED DESCRIPTION

Figure 1:
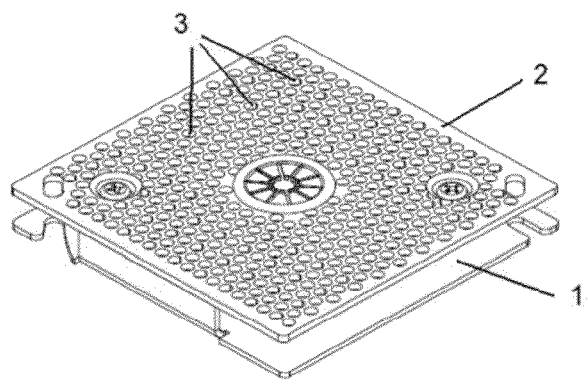
FIG. 1 shows a lath cover fitted to a cover plate.
Figure 2:
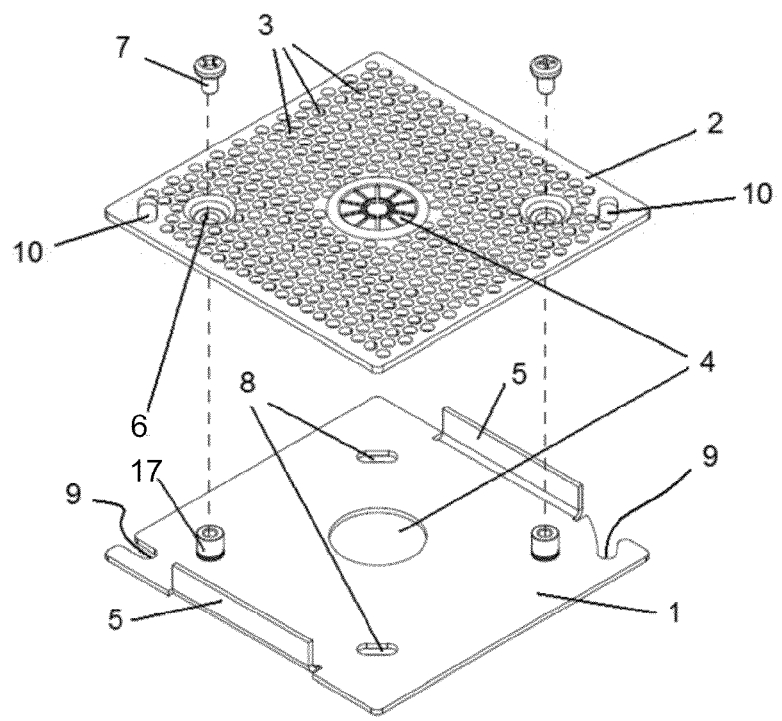
FIG. 2 shows an exploded view of FIG. 1.

FIGS. 1 and 2 illustrate a cover plate (1) to which a lath cover (2) is fitted at a distance therefrom. Spacers (5) determine the distance between the two plates. This distance can be determined depending on the thickness of the wall finish.

The lath cover (2) is fitted on the cover plate (1) by means of screws (7) which are secured to corresponding elements (17) in the cover plate (1) through openings (6) in the lath cover.

The lath cover (2) has a pattern of holes (3) which also ensures a strong connection with the plaster (13) and several locations where the fitting screws of the lighting elements can engage.

The cover plate (1) and the lath cover (2) have a suitable and sufficiently large opening (4) for the passage of the power supply (15) from the housing (12). The dimensions of the opening for the passage of the electrical conductors may, for example, be adapted to the installation regulations which are in force in North America, in particular UL1598.

In this embodiment, the dimensions or size of the cover plate (1) and the lath cover (2) are such that they cover the open front side of the housing (12).

Figure 3:
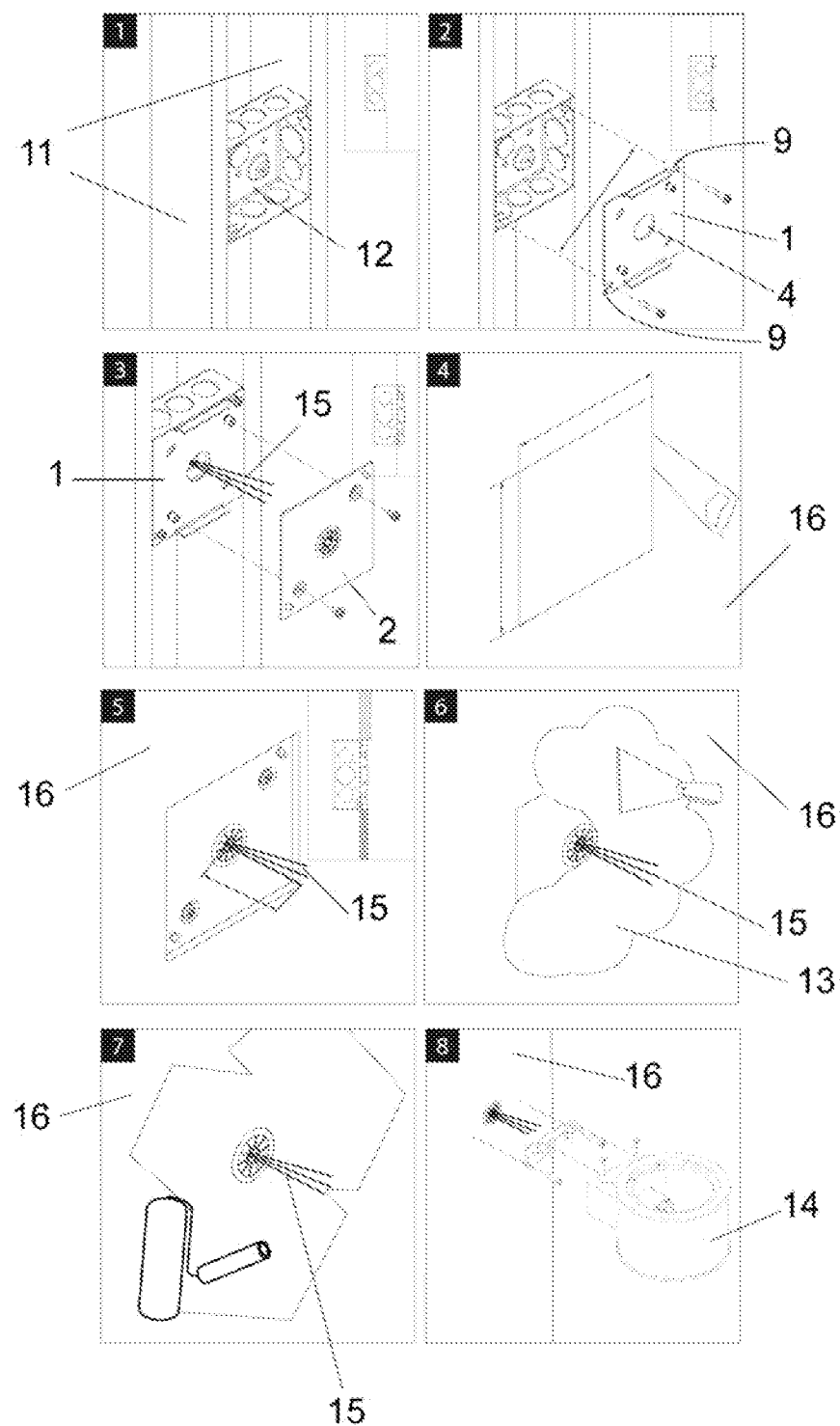
FIG. 3 shows a step-by-step plan of the fitting of a fixture using a system according to the invention.

By means of the notches (9) and screws (7), the cover plate (1) is fitted to the housing (see step 2 in FIG. 3). Alternatively, holes (8) can be used to fit the cover plate onto housings of a smaller size.

FIG. 3 shows a method for fitting and electrically connecting a lighting element according to the system of the invention, consisting of the following steps:

Step 1: fitting the housing (12) with the open front side into the wall structure (11). As is shown in the detail side view, the open front side just reaches the front side of the wall structure (11).

Step 2: fitting the cover plate (1) for the open front side of the housing (12) by means of notches (9). As is shown in the detail side view, the cover plate just reaches the front side of the wall structure (11).

Step 3: fitting the lath cover (2) to the cover plate (1) by means of screws (7) and openings (6). As is shown in the detail side view, the lath cover protrudes from the wall structure (11). Optionally, the lath cover can also first be fitted to the cover plate before it is fitted to the housing. Mounting means for fitting the lath cover and the cover plate to the housing may be fitted via openings (10) and notches (9). A screwdriver fits through the holes (10) and the heads of the screws adjoin the notches (9).

Step 4: making an opening in the wall finish (16), typically of the size or having the dimensions of the lath cover (2). The wall finish (16) is, for example, a gyproc plate.

Step 5: fitting the wall finish (16) to the wall structure (11) at the location of the installed housing (12) and the lath cover (2). The power supply (15) passes from the housing (12) through the openings (4) of the cover plate (1) and the lath cover (2) to the outside. As is shown in the detail side view, the lath cover (2) sits slightly deeper in the wall than the wall finish (16).

Step 6: plastering (13) the opening.

Step 7: finishing, for example by painting, leaves only the power supply (15) and the opening (4) visible. The concealed perforated plate of the lath cover now makes it possible to penetrate the plaster and to use every hole of the lath cover as a fitting opening for self-tapping screws. In this way, the structure makes it possible to fit a large variety of lighting elements.

Step 8: attaching the fixture via the power supply (15).

Figure 4:
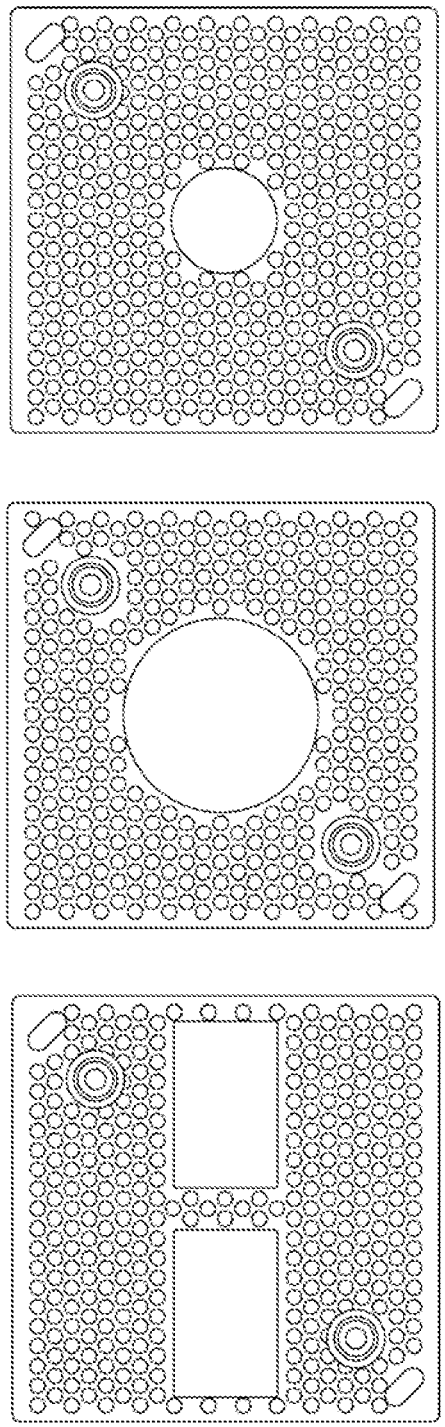
FIG. 4 shows alternative embodiments of openings in the cover plate and the lath cover.

FIG. 4 shows some alternative embodiments of openings in the cover plate and lath cover, with one or more openings being provided which may be round, rectangular or any other shape which is suitable for fitting mounting means in the housing via the opening.

The invention claimed is:

1. A system for fitting and electrically connecting lighting elements, comprising: at least one housing accommodated in a wall, the at least one housing provided with an open front side and a power supply therein, a cover plate mounted on the housing to cover the at least one housing, and further a lath cover with a pattern of holes for mounting any of a variety of lighting or other fixtures, which is attached on the front side of the at least one housing in order to be concealed in the wall, wherein the lath cover is fitted on the cover plate at a distance therefrom, said distance determined by spacers depending on a thickness of a wall finish.

2. The system as claimed in claim 1, wherein the cover plate and the lath cover comprise one or more openings through which the power supply is accessible.

3. The system as claimed in claim 1, wherein the power supply can be introduced into the housing after the wall finish has been completed.

4. The system as claimed in claim 1, wherein the cover plate covers at least the open front side of the housing completely.

5. The system as claimed in claim 1, wherein the length and/or width dimensions of the cover plate are greater than those of the open front side of the housing.

6. The system as claimed in claim 1, wherein the cover plate forms the base for mounting a fixture.

7. The system as claimed in claim 1, wherein the dimensions of the cover plate are adapted to the dimensions of the fixture to be mounted.

8. The system as claimed in claim 1, wherein the cover plate is made of metal or plastic.

9. The system as claimed in claim 1, wherein the cover plate comprises notches for securing it to the housing, as well as mounting elements for securing the lath cover and/or a fixture.

10. The system as claimed in claim 1, wherein one cover plate covers several housings jointly.

11. The system as claimed in claim 10, wherein the housings are fitted next to or above each other.

12. The system as claimed in claim 10, wherein the housings have different dimensions.

13. The system as claimed in claim 1, wherein the system is completely concealed in the wall.

14. The system as claimed in claim 13, wherein a fixture can be mounted and connected to the system.

* * * * *